United States Patent [19]

Martin

[11] 4,430,460

[45] Feb. 7, 1984

[54] PROCESS FOR PREPARING CONDUCTIVE PVC MOLDING COMPOSITIONS

[75] Inventor: Carl J. Martin, Indianapolis, Ind.

[73] Assignee: RCA Corporation, New York, N.Y.

[21] Appl. No.: 433,504

[22] Filed: Oct. 8, 1982

Related U.S. Application Data

[63] Continuation of Ser. No. 41,747, May 23, 1979, abandoned.

[51] Int. Cl.$^3$ .................. C08L 27/06; C08J 3/20
[52] U.S. Cl. ................... 523/174; 252/511; 521/56; 521/145; 528/490
[58] Field of Search .......... 523/174; 528/490; 521/56, 145; 252/511

[56] References Cited

U.S. PATENT DOCUMENTS

| | | |
|---|---|---|
| 3,337,193 | 8/1967 | Berker. |
| 4,151,132 | 4/1979 | Khanna .................. 260/23 XA |
| 4,228,050 | 10/1980 | Martin et al. ........... 260/23 XA |

OTHER PUBLICATIONS

Schildknecht, Polymer Processes, pp. 715–716, 1956.
Kirk-Othmer, Encyclopedia of Chemical Tech., 2nd Ed., vol. 17, pp. 614–620, 1968.
Modern Plastics Encyclopedia, 1963, pp. 724–725.

*Primary Examiner*—Harold D. Anderson
*Attorney, Agent, or Firm*—Birgit E. Morris

[57] ABSTRACT

Low density conductive carbon black agglomerated particles are finely divided to a particle size below 0.044 millimeter and added in a portionwise manner to a PVC resin in a closed system. The process ensures a uniform dispersion of the carbon black into the PVC resin and uniform bulk and surface properties of articles molded from the resultant resin.

4 Claims, 2 Drawing Figures

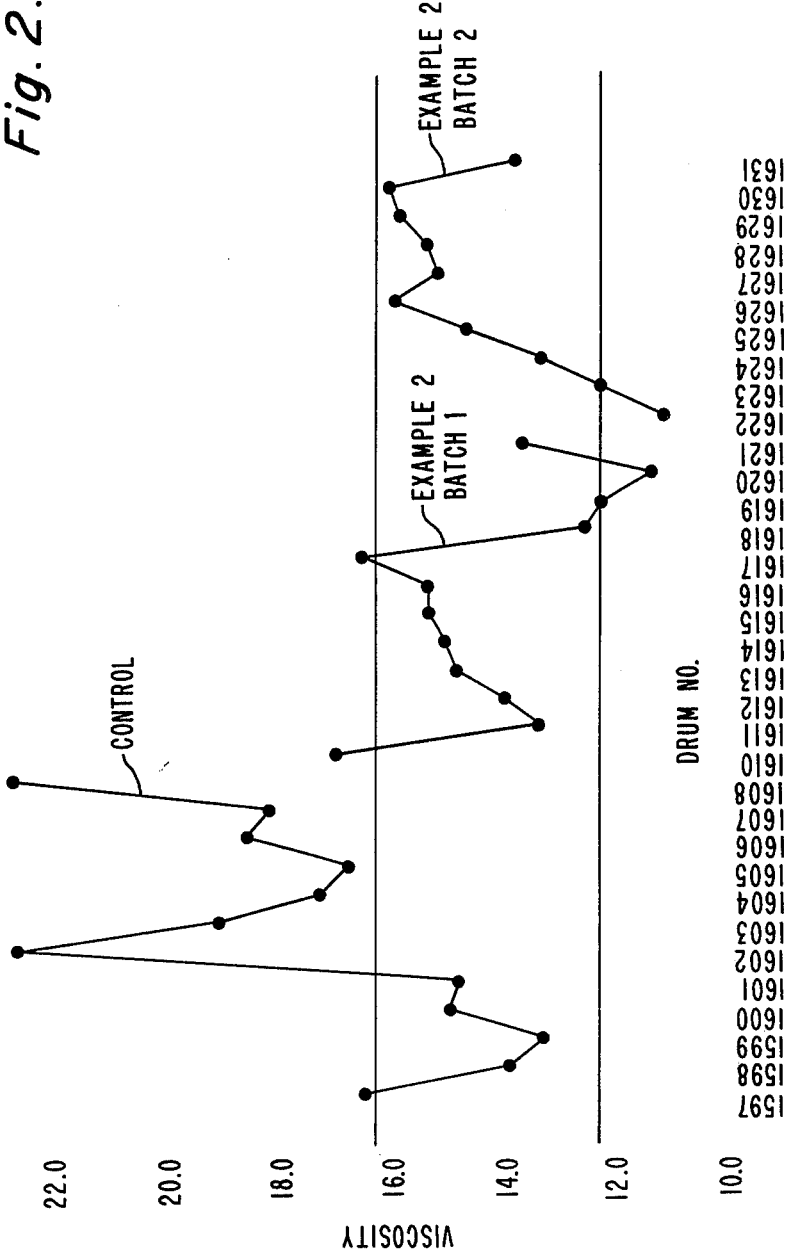

PROCESS FOR PREPARING CONDUCTIVE PVC MOLDING COMPOSITIONS

This is a continuation of application Ser. No. 41,747, filed May 23, 1979, now abandoned.

This invention relates to a process for making a conductive molding composition. More particularly, this invention relates to a process for making conductive polyvinylchloride-based molding compositions with improved dispersion of the conductive material.

BACKGROUND OF THE INVENTION

Conductive polyvinylchloride (PVC)-based molding compositions suitable for compression molding of video discs have been disclosed by Fox et al in copending application Ser. No. 818,279, filed July 25, 1977, now abandoned. The molding composition contains sufficient amounts of conductive carbon black particles to impart a maximum resistivity of 500 ohm-cm at 900 MHz. Various molding compositions disclosed contain from about 15 to about 35 percent by weight of the molding composition of conductive carbon black. Because of the high solids content, the molding compositions were stiff and difficult to mold.

These highly conductive PVC molding compositions were modified by Khanna as disclosed in copending application, Ser. No. 818,716, also filed July 25, 1977, now U.S. Pat. No. 4,151,132. Large amounts of a variety of lubricants, processing aids and modifiers were added to a mixture of PVC resins to improve the processability. However, these compositions have less than the desired dimensional stability at elevated temperatures.

Martin et al, in copending application Ser. No. 3,363, filed Jan. 15, 1979, now U.S. Pat. No. 4,228,050, disclose further improvements to the molding compositions whereby video discs with improved dimensional stability at temperatures up to 130° F. (54.4° C.) and excellent processability can be molded. These compositions have a lesser total amount of additives than the compositions of Khanna, and also limit the amount of liquid additives that can be present. These molding compositions comprise a PVC based resin; conductive carbon black in amounts necessary to obtain the required resistivity; from about 1.5 to 4 percent by weight of stabilizers; from about 1-3 percent by weight of at least 2 lubricants; and up to 10 percent by weight of additional modifiers, with the proviso that not more than 5 percent by weight of liquid additives are present.

For molding compositions containing large quantities of additives, the materials must be blended in a high intensity mixer such as a Henschel, Welex or Papenmeier type mixer. This type mixer is bowl shaped and has a high speed agitator projecting from the bottom whereby the ingredients are pulled into a vortex in the center of the agitator and whirled around to the walls of the bowl. These mixers develop a great deal of shear, raising the temperature so that a uniform dispersion of the ingredients is achieved. The resin and solid additives are generally mixed to a temperature of at least about 120° F. (48.9° C.), liquid ingredients are added, and mixing continued to a temperature of 160° F. (71.1° C.) or higher. After cooling down to about 80°–120° F. (26.7°–48.9° C.), the blended mixture is plasticated in a Banbury type mixer or an extruder where the mixture is subjected to high temperatures of about 300°–500° F. (148.9°–260° C.) with high shear to form a dough-like mass which can be formed into tubing or solid strands which are cut into pellets for storage.

Excellent video discs can be made from the above compositions which are dimensionally and environmentally stable. No staining is apparent on the discs, replication of the minute information pattern is excellent and playback is of high quality.

However, difficulties were encountered when the above process was scaled up to commercial quantities. Because of the low bulk density of the preferred carbon black, it is very difficult to mix in with the PVC resin and some of it is lost. Also because of the low bulk density of the carbon black, it is difficult to weigh the carbon black accurately and batch to batch variations in the amount of carbon in the molding composition were noted. In addition, the dispersion of the carbon black varied from batch to batch. On investigation it was found that the preferred carbon black has a wide particle size distribution; although the innate particle size of the carbon black is very small, the carbon particles agglomerate into larger particles which do not break up in a high intensity mixer. This large particle size leads to non-uniformity in playback performance of the video discs, to defects in the disc surface and even to scratching of the stampers during molding.

Thus, a process to improve the uniformity of the above molding composition and to improve the dispersion of large amounts of carbon black particles in a PVC resin was sought.

SUMMARY OF THE INVENTION

The present process combines finely dividing the carbon black particles to a particle size of about 0.044 millimeters or less, and adding the finely divided carbon black to PVC resin particles in a stepwise manner. These steps ensure a uniform dispersion of the carbon black into the PVC resin and uniform bulk and surface properties of video discs molded from the resultant molding composition.

BRIEF DESCRIPTION OF THE DRAWINGS

FIG. 2 is a graph showing variations of shear stress at a shear rate of 4.42 ($sec^{-1}$) for various PVC resin composition samples.

DETAILED DESCRIPTION OF THE INVENTION

Figure 1:
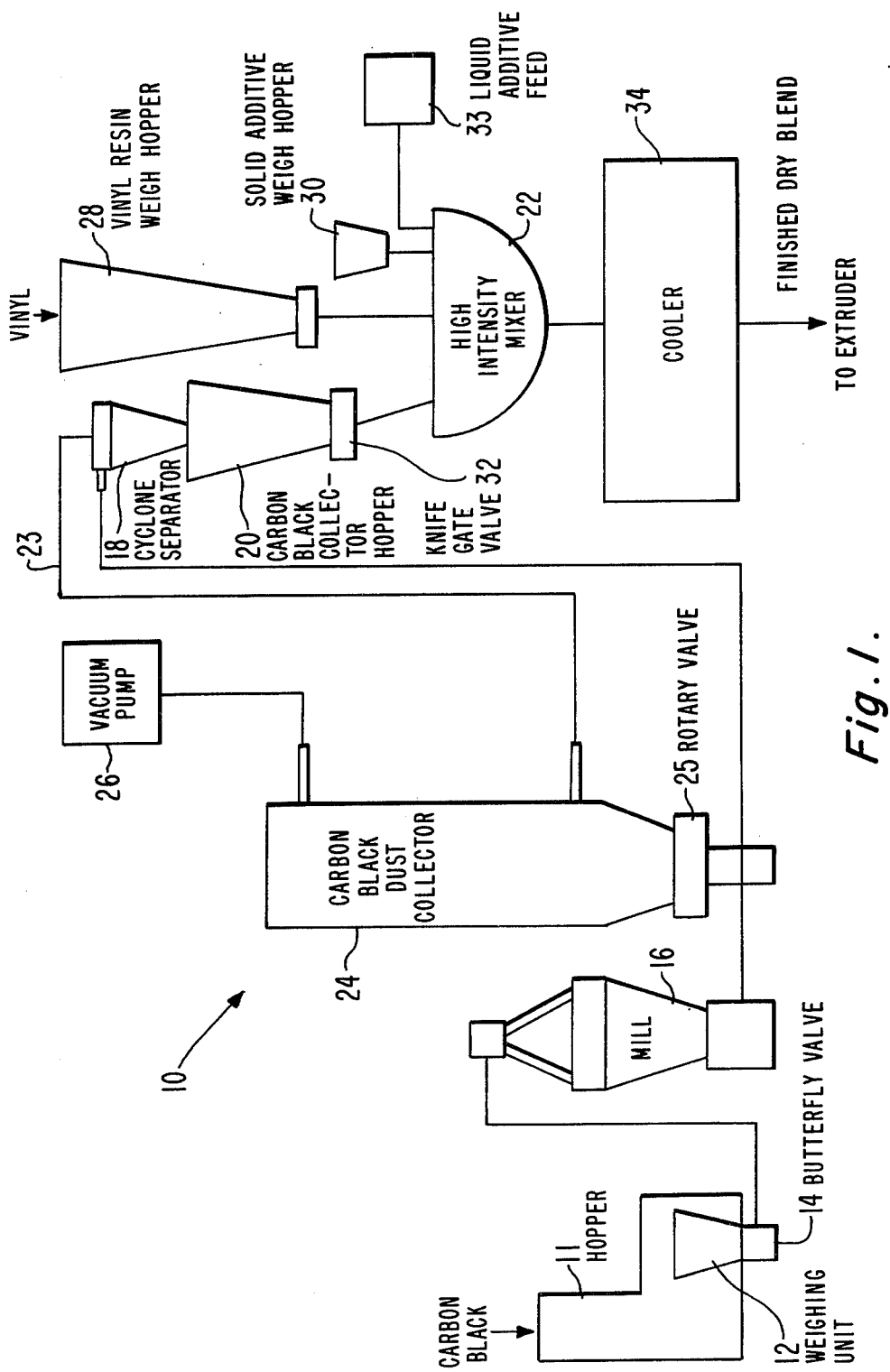
FIG. 1 is a block diagram showing the passage of the carbon black from the initial feed to the final mixer.

Referring to FIG. 1, the resin mixing system 10 comprises a feed hopper 11 for conductive carbon particles which contains a weighing unit 12. A suitable weighing unit 12 includes a hopper for storing excess carbon black and an auger or screw conveyor to convey the carbon black to a basket which is preset to accept a predetermined quantity of material. A pneumatic load cell and a digital display on a remote control panel complete the weighing unit 12.

When the desired amount of carbon black is collected in the weighing unit 12, on demand the carbon black passes through a butterfly valve 14 and is pneumatically conveyed to a mill which breaks up agglomerates of the carbon particles 16 to the desired particle size. We have found a mill of the Centrimil type, manufactured by Entoleter Inc. of New Haven, Conn. to be suitable. This mill comprises a series of sets of rotatable pins wherein each set intermesh between top and bottom and rotate at very high speeds. Carbon particles which pass through the Centrimil are knocked against these pins. The carbon particles are reduced to a uniform size by a bombarding action, with no shear or attrition forces generated. The final particle size of the carbon black can be varied by varying the number of sets of pins traversed by the carbon black particles through the mill, and by varying the speed of rotation of the pins. We have found that by using 5 sets of steel pins and rotating them at 6000 rpm, over 99 percent by weight of the carbon black particles will pass through a 325 mesh screen (U. S. Sieve Series), corresponding to a particle size of about 0.044 millimeters, and about 94–96 percent will pass through a 400 mesh screen, corresponding to a particle size of 0.038 millimeters. It takes about 40 seconds to grind about 7 pounds (3,175.2 grams) of carbon black. During this step the bulk density of the carbon black changes from about 140–160 grams per liter for the starting material to about 45–55 grams per liter for the milled particles.

The now finely divided carbon black particles from the mill 16 are conveyed to a cyclone separator 18 where the carbon particles are deaerated and held in a carbon black collector hopper 20 which connects to a high intensity mixer 22.

The air from the cyclone separator 18 is then conveyed through a vacuum line 23 to a carbon black dust collector 24 wherein any airborne carbon black particles are separated from the air, dropped onto the bottom of the dust collector 24 and are conveyed through a rotary valve 25 back to the collector hopper 20. This closed system ensures against loss of carbon black and against inadvertent discharge of carbon black into the atmosphere. The purified air from the dust collector 24 is pumped away through vacuum pump 26.

A suitable high intensity mixer 22 is manufactured by Welex Inc. of Blue Bell, Pa. This mixer brings the ingredients to be mixed down into a vortex, through a mixing blade, up along the side walls of the mixer and down into the vortex again. This type of mixing generates high shear and high speeds of inter-particle friction and promotes a uniform dispersion of the ingredients.

The PVC resin is weighed in a vinyl weigh hopper 28 and the solid additives, including stabilizers, lubricants and modifiers, weighed in a solid additive hopper 30. The PVC resin and solid additives are charged to the mixer 22 through a conveyor system and the mixer 22 is turned on for a few seconds to mix the resin and the additives. The mixer 22 is shut off, a first batch of carbon black from the carbon black collector hopper 20 is added through a knife gate valve 32 and the mixer 22 turned on again for about 30–45 seconds at low speed to mix the carbon black with the resin. Conveniently about ¼ of the total carbon black is added at a time; however this is not critical.

The knife gate valve 32 is closed automatically about 60 seconds after the collector hopper 20 is emptied. This action turns on the mill 16 and the vacuum pump 26. The butterfly valve 14 opens and the next portion of carbon black is discharged from the weighing unit 12, passed through the mill 16 and on to the cyclone separator 18 where it is deaerated and discharged into the collector hopper 20. When all of the carbon black has been discharged from the weighing unit 12, the butterfly valve 14 closes. Forty (40) seconds later, the mill 16 and vacuum pump 26 are shut off. The next portion of carbon black is then weighed into the weighing unit 12.

After the first portion of carbon black is mixed as above, additional portions of carbon black are added to the mixer and mixed at low speeds until about half of the carbon black has been added. During these additions, the carbon black is primarily filling up voids in the vinyl particles, which are initially very irregularly shaped and porous. When additional amounts of carbon black are added however, the temperature of the resin must be increased enough so that the resin particles begin to adsorb additional carbon particles within the resin structure. The temperature required is a function of the glass transition temperature, hereinafter $T_g$, and melting point of the particular vinyl polymer used; lower $T_g$ resins will adsorb carbon particles at lower temperatures than higher $T_g$ resins for example. Thus additional portions of carbon black are mixed using both low and high speed mixing to increase the temperature of the resin, thereby softening its surface and allowing increased adsorption of carbon black into the resin. The final temperature of the resin will be determined by the amount of carbon black to be added and the physical properties of the PVC resin.

After all of the carbon black has been added and mixed, the liquid additives are conveyed from the liquid additive feed 33 into the mixer 22 and blended at low speeds. When the liquid has been dispersed, a final high speed mixing is carried out to ensure a completely uniform dispersion of all of the ingredients. During this mixing period, the bulk density of the vinyl powder, which may originally be about 500–600 grams per liter, will decrease, generally to about 300–350 grams per liter, due to the expansion of the vinyl particles on heating. The vinyl particles then adsorb carbon black particles, solid additives and liquid additives, which in turn raises the bulk density to about 450 grams per liter.

The resin blend is then discharged to a cooler 34 where it is cooled to about 80°–100° F. (26.7°–37.8° C.). During the cooling period the vinyl particles contract, and some additional adsorption may occur, so that the cooled molding composition may have a bulk density of about 500–550 grams per liter, similar to the starting vinyl resin.

Polyvinylchloride resins suitable for use herein include polymers and copolymers of vinyl chloride and mixtures thereof. In order to produce a desired characteristic in the molded articles, the PVC resin should have a comparatively high heat distortion temperature, preferably 140° F. (60° C.) or higher for the unfilled resin. Suitable polymers include homopolymers of vinyl chloride such as a PVC resin available from the B. F. Goodrich Company which has a weight average molecular weight of 84,400 and number average molecular weight of 38,140 and a $T_g$ of 88° C.; or a vinyl chloride-polypropylene copolymer commercially available as AP-480 from Air Products & Chemicals Inc. which has a $T_g$ of 76° C. Other PVC homopolymers such as Great American Chemical Company's 550 Resin and Air Products' 2160 Resin and the like can also be employed.

Conductive carbon particles suitable for use in the molding compositions include highly electrically conductive carbon blacks, preferably which have a low bulk density to reduce loading requirements. Presently preferred is a product of the Akzo Chemie Nederland, Ketjenblack EC, which has an apparent bulk density of about 140–160 grams per liter and an average primary particle size of about 300 angstroms. These carbon black particles have a high surface area and a high proportion of voids within the particles, as measured by dibutylphthalate absorption. This enables current to flow between the conductive particles in a non-conductive polymer matrix in a highly efficient manner. Other carbon blacks can also be employed, in whole or in part, provided they meet the electrical requirements. Denser particles of carbon will usually require higher weight loading, e.g., up to about 35-40 percent by weight, for an equivalent electrical conductivity. The particle size is not critical but it must be small enough so that a grainy surface in the plastic matrix is avoided. An amount of from about 12-20 percent by weight of a carbon black such as Ketjenblack EC is preferred.

Stabilizers are also added to PVC compositions, primarily to neutralize volatiles formed as decomposition products of the polyvinylchloride resin, particularly hydrogen chloride. Generally from about 1.5 to 4 percent by weight of stabilizers are added to the chosen PVC composition. Suitable stabilizers include organo tin compounds such as dibutyltin-$\beta$-mercaptopropionate, commercially available as T-35 from M & T Chemical Company, Inc. and dibutyltin maleate, commercially available as Mark 275 from Argus Chemical Company. Other metallic compounds derived from metals such as lead, zinc, barium and cadmium stearates, commercially available as Mark Q-232B from Argus Chemical Company can also be used. If too much stabilizer is added to the resin it will not be absorbed, resulting in bleed-out or staining of the surface. Thus it is preferred to employ small amounts of more than one stabilizer in a particular molding composition.

Lubricants are also added to PVC compositions to prevent high shear heating during processing and to provide good release of the molded disc or other article from the mold. Generally from about 1-3 percent by weight of the molding composition of lubricants will be employed. Suitable lubricants for PVC resins include calcium stearate; a room temperature solid esterified montan wax commercially available as Wax E of Hoechst Company; a monofatty acid ester of varying molecular weight alcohols and acids commercially available as Loxiol G-30 from Henkel International GmbH; polyfunctional complex esters of saturated fatty acids commercially available as Loxiol G-70, also available from Henkel International; low molecular weight paraffin oils such as Olio di Vasilina from Carlo ERBA, a division of Chemica Industrialle, Milan; and materials such as fatty acid amides including stearic amide, oleamide, ethylene bis stearamide and the like. At least two lubricants should be employed, again, to prevent bleed-out of the lubricant during the molding process.

Additional modifiers including plasticizers and processing aids in amounts up to 10 percent by weight of the resin composition can also be added. The addition of primary plasticizers lowers the $T_g$ of the resin composition and the heat distortion temperature. These materials are compatible with PVC resins. Liquid primary plasticizers have the greatest effect on the $T_g$ and the heat distortion temperature. Suitable liquid plasticizers include epoxidized soybean oils having molecular weights of about 1000, commercially available as Paraflex G-62 from Rohm & Haas Company; primary phthalate type plasticizers such as diisooctylphthalate and Santicizer 711 from Monsanto Company; and polymeric ester plasticizers such as Kodaflex NP-10 available from Eastman Chemical Products.

The addition of solid plasticizers and processing aids have a small effect, if any, on the $T_g$ of the resin composition and the heat distortion temperature, and are added to improve the processing and molding characteristics of the resin composition. Suitable solid plasticizers include chlorinated paraffin waxes such as Unichlor 70AX from Neville Chemical Company; glyceryl tribenzoate commercially available as Benzoflex S-404 from Velsicol Chemical Corporation; and dicyclohexylphthalate.

Suitable processing aids include low molecular weight acrylic resins, such as polymethylmethacrylate resins commercially available as Acryloid K-147 and Acryloid K-175 from Rohm and Haas Company.

The above process produces a composition containing large amounts of carbon black particles uniformly dispersed in a vinyl resin with a minimum of batch to batch variations. Although the exact reasons for the success of the present process is unknown, it is believed that by finely dividing the carbon black particle agglomerates so that they are substantially smaller than the vinyl particles, they are easier to mix and disperse and they are able to be absorbed into the voids present in the vinyl particles. By increasing the temperature of the vinyl as more carbon black is added, more adsorption of the carbon black onto the surface of the vinyl particles also takes place. The closed system described prevents losses of carbon, allows exact weighing of low density carbon particles and minimizes batch to batch variations. Video discs of high quality and reproducibility can be molded from the compositions made by the above process.

The invention will be further illustrated by the following Examples which are not meant to limit the invention. In the Examples, parts are by percent.

EXAMPLE 1

Using a system illustrated in FIG. 1, 74.75 parts of vinyl resin, 1.50 parts of T-35 stabilizer, 2.00 parts of Acryloid K-147 processing aid, 0.75 part of Acryloid K-175 processing aid, 0.75 part of G-30 lubricant, 0.25 part of G-70 lubricant and 0.50 part of calcium stearate lubricant were added at room temperature to a Welex mixer which was preheated to 165° F. (73.9° C.). The ingredients were mixed for 30 seconds at low speed (400 rpm) when the temperature was about 108°-109° F. (41.7°-42.2° C.). A first portion of conductive carbon black, Ketjenblack EC which had been processed through a Centrimil so that the milled black had an apparent bulk density of about 50 grams per liter and wherein less than 1 percent of the milled particles were retained on a 325 screen (U. S. Sieve Series), 3.75 parts, was added and stirred at low speeds for 30 seconds when the temperature reached 125°-127° F. (51.7°-52.8° C.). The mixer was shut off for 1 minute to allow the next portion of milled carbon to reach the collector hopper and the second 3.75 part portion of carbon was added, stirred at low speed when the temperature reached 136°-138° F. (57.8°-58.9° C.). The third 3.75 portion of milled carbon was then added in similar manner, but mixed first at low speed for 30 seconds (the temperature was now 154°-160° F.) (67.8°-71.1° C.) and then at high speed (800 rpm) for about 60 seconds or until the temperature reached at least 150° F. (65.6° C.), whichever was last. Typically the temperature was now about 156°-159° F. (68.9°-70.6° C.). The fourth 3.75 part portion of milled carbon was then added, mixed for 30 seconds at low speed when the temperature was 165°-170° F. (73.9°-76.7° C.) and then at high speed to a temperature of 165° F. (73.9° C.) or for 60 seconds. The liquid additives were then added; 1.00 part of Mark 275, 3.0 parts of Santicizer 711 and 0.30 part of Olio di Vasilina. The liquids were stirred in at low speed until the temperature reached 171°–175° F. (77.2°–78.9° C.) (2–3 minutes) and then the mixture was stirred at high speed until the temperature reached 235° F. (112.5° C.) (about 8.5–9.5 minutes). The blend was cooled, fed to a plasticating extruder and pelletized.

Excellent video discs were compression molded from the above composition.

CONTROL

A molding composition was prepared by charging the following ingredients at room temperature in a Welex mixer preheated to 165° F. (73.9° C.): 74.05 parts of a vinyl chloride-polypropylene copolymer AP-480 of Air Products & Chemicals, Inc. which has a $T_g$ of 76° C.; 15.00 parts of conductive carbon black Ketjenblack EC which had an apparent bulk density of 157 grams per liter and wherein 18 percent of the carbon black remained on a size 18 screen (U. S. Sieve Series); 0.50 part of Loxiol G-30 lubricant and 0.25 part of Loxiol G-70 lubricant; 0.30 part of calcium stearate lubricant; 2.00 parts of Acryloid K-175 processing aid; 1.50 parts of the stabilizer T-35; 0.40 part of Wax E lubricant; 1.00 part of Benzoflex S-404 modifier and 2.00 parts of chlorinated paraffin wax Unichlor 70AX modifier.

The ingredients were mixed for 30 seconds at low speed, when the temperature was 104°–106° F. (40.0°–41.1° C.) and then at high speed until the temperature reached 165° F. (73.9° C.). The liquid additives were then poured in; 1.00 part of dibutyltin maleate Mark 275 and 1.00 part of epoxidized soybean oil Paraplex G-62. The liquid additives were stirred in at low speed until the temperature reached 170° F. (76.7° C.) and then mixed at high speed until the temperature reached 190° F. (87.8° C.), which took about 2.5–3 minutes. The mixture was cooled, fed to a plasticating extruder and pelletized.

Twelve batches were mixed as above, pelletized and stored in twelve drums. The melt viscosity of a sample of each drum was measured using shear stress data at a shear rate of 4.42 (sec$^{-1}$). The measured shear stress data for each drum was plotted as shown in FIG. 2.

EXAMPLE 2

Two lots of 10–12 drums each, designated lot 1 and lot 2, of a composition containing the same ingredients as the Control were mixed in accordance with the procedure described hereinabove in Example 1 using the system as in FIG. 1, except that the final temperature was 190° F. (87.0° C.) instead of 235° F. These lots were cooled, fed to a plasticating extruder and pelletized.

The melt viscosity from each of the drums of lots 1 and 2 was measured using shear stress data at a shear rate of 4.42 (sec.$^{-1}$). The measured shear stress data was plotted in FIG. 2. Drums 1597–1608 were compositions of the Control; drums 1610–1621 were compositions of Example 2 lot 1; and drums 1622–1631 were compositions of Example 2 lot 2. The desired viscosity is within the range 12.5–16.5. It is apparent that the sample to sample variation for the compositions made according to the present process is less than that for the prior art method of the Control, indicating a more uniform dispersion of ingredients was achieved using the present disclosed process.

What is claimed is:

1. In a process for mixing low density conductive carbon black particles with polyvinyl chloride resin particles in such amount so that the resultant particulate composition has a bulk resistivity below about 500 ohm-cm at 900 MHz, the improvement which comprises
   (a) weighing a first portion of carbon black particles,
   (b) dividing the carbon black particles to a particle size of 0.044 millimeter or less,
   (c) weighing the polyvinyl chloride resin particles and additives into a high intensity mixer,
   (d) transporting the carbon black particles to said mixer in a closed system,
   (e) mixing the carbon black with the polyvinyl chloride particles until the carbon black particles are adsorbed,
   (f) weighing, dividing and adding another portion of carbon black particles to the mixer,
   (g) mixing until the carbon black is adsorbed,
   (h) repeating steps (f) and (g) until all of the carbon black has been added to said mixer, and
   (i) mixing until all the ingredients are uniformly dispersed and no unadsorbed carbon black is present.

2. The process according to claim 1 wherein the carbon black has an initial bulk density of about 140–160 grams per liter.

3. The process of claim 1 wherein the carbon black particles are deaerated prior to conveying to the mixer.

4. The process of claim 1 wherein liquid additives are added after all of the carbon black has been added.

* * * * *